United States Patent
Okabe et al.

[11] Patent Number: 5,837,956
[45] Date of Patent: Nov. 17, 1998

[54] METHOD OF FABRICATING HIGH STRENGTH AND HIGH TOUGHNESS LARGE-DIAMETER WELDED STEEL PIPE

[75] Inventors: Takatoshi Okabe, Aichi; Koichi Yasuda, Okayama, both of Japan

[73] Assignee: Kawasaki Steel Corporation, Japan

[21] Appl. No.: 875,884

[22] PCT Filed: Dec. 18, 1996

[86] PCT No.: PCT/JP96/03693

§ 371 Date: Aug. 7, 1997

§ 102(e) Date: Aug. 7, 1997

[87] PCT Pub. No.: WO97/25522

PCT Pub. Date: Jul. 17, 1997

[30] Foreign Application Priority Data

Dec. 28, 1995 [JP] Japan .................................. 7-342241

[51] Int. Cl.⁶ .................................................. B23K 9/18
[52] U.S. Cl. ........................................ 219/61; 219/73
[58] Field of Search ...................... 219/61, 73, 137 WM

[56] References Cited

U.S. PATENT DOCUMENTS 4,020,312  4/1977  Araki et al. ................................ 219/61

FOREIGN PATENT DOCUMENTS 3-285770  12/1991  Japan .
5-375     1/1993   Japan .
7-164150  6/1995   Japan .

*Primary Examiner*—Clifford C. Shaw
*Attorney, Agent, or Firm*—Austin R. Miller

[57] ABSTRACT

Utilizing a low-oxygen welding flux, and a low carbon welding wire, seam welding is conducted by submerged arc welding so that the resulting weld metal has a chemical composition, in which $P_{WM}$ value defined as below is in a range of from 0.18 to 0.33, and a micro-structure containing acicular ferrite not less than 55% by area ratio:

$$P_{WM}=P_{cm}+3.19Ti-1.020$$

where, $$P_{cm}=C+Si/30+(Mn+Cu+Cr)/20+Ni/60+Mo/15+V/10+5B$$

Furthermore, when cracking resistance is required, submerged arc welding is conducted such that the chemical composition of the weld metal satisfies $P_{rh}$ value of less than 2.8, in addition to fulfilling the above conditions:

$$P_{cm}=C+Si/30+(Mn+Cu+Cr)/20+Ni/60+Mo/15+V/10+5B.$$

2 Claims, 3 Drawing Sheets

FIG. 5

METHOD OF FABRICATING HIGH STRENGTH AND HIGH TOUGHNESS LARGE-DIAMETER WELDED STEEL PIPE

TECHNICAL FIELD

The present invention relates to a method of fabricating a high strength and high toughness large-diameter welded steel pipe used as a line pipe and, in particular, relates to improvement in strength, toughness, and cracking characteristics of welded joint of a large-diameter welded steel pipe.

BACKGROUND ART

It is well-known that pipelines are used as means for large-scale transport of crude oil or natural gas mined as crude fuel, liquids or gases obtained by refining the crude fuel, or other kinds of liquids, gases, or slurries. These pipelines are extremely effective as means for large-scale transport of industrial crude fuel, and line-pipes durable to withstand more severe environment are required.

Large-diameter UOE steel pipes are used as line-pipes. Recently, the above energies are supplied to various places such as cold districts and the sea floor, therefore higher characteristics are in demand for line-pipes.

In particular, line-pipes placed in cold districts are required to have both strength and excellent low-temperature toughness. Furthermore, in the case of gas pipelines, transport pressure inside pipes tends to increase to improve transport efficacy and, correspondingly, higher strength is in demand for line-pipes. To meet the above requirements, development of steel plates and welding materials have continued so that the strength of UOE steel pipes has gradually improved from the X 50 grade and, at present, steel pipes of the X 70 grade are being put to practical use.

Appropriate quantities of Ti, B, and Mo are added to weld metal for UOE steel pipes of up to the X 70 grade to improve strength and toughness of the weld metal. The microstructure of the weld metal thereby essentially consists of acicular ferrite. Since acicular-ferrite has fine grains, the weld metal can attain high strength and high toughness.

For example, Japanese Examined Patent Publication No. 57-17637 proposes a submerged arc welding method in which a high toughness weld metal is obtained by addition of Ti, B, and Mo to a weld wire to adjust the composition of weld metal so as to achieve a refined micro-structure in the weld metal.

Furthermore, Japanese Unexamined Patent Publication No. 63-2588 discloses a welded steel pipe excellent in field weldability. In this steel pipe, the chemical composition ($P_{cm}$) of steel-pipe material is set to a low value and the chemical composition of seam weld metal, in particular the contents of Ti, B, and Mo, are controlled so that low hardness is achieved in a weld metal with relatively low weling heat input in the field and in portions heat-affected the field welding, thereby providing a pipe showing both corrosion resistance and high toughness.

Moreover, Japanese Unexamined Patent Publication No. 3-285770 proposes a method of fabricating a large-diameter steel pipe which reduces the hardness of a girth weld metal and its heat affected zone by, in particular, containing Ti in the chemical composition of steel-pipe material and weld metal while balancing against Al, O, and N to achieve excellent sour gas resistance. In this method, the composition of weld metal is controlled such that the weld metal forms acicular ferrite.

According to each of the above methods, large-diameter steel pipes of the X 60 to 70 grades can be manufactured while lowering the hardness of weld metal by controlling the chemical composition of the weld metal. However, demand for higher strength line-pipes is increasing and high strength line-pipes up to the X 100 grade have been investigated.

The largest problem that has to be overcome for achieving higher strength steel pipes is the prevention of cracks occurring in welded joints of steel pipes. Cracks in welded joints include hot cracking and cold cracking. Hot cracking occurs at a temperature range of above approximately 1,000° C. during cooling process of welding and is grain-boundary cracking due to the formation of compounds having low melting points, such as P, S, and Ni, in the grain boundaries. Cold cracking occurs during or after a cooling process of welding; appears in a weld heat affected zone or weld metal; and occurs due to increases in diffusible hydrogen content and alloy-element content and the existence of restrained tensile stress. Therefore, both hot cracking and cold cracking susceptibilities increase according to the alloy-element content of weld metal. In addition, reheat cracking occurs when weld metal is reheated after welding and this cracking also readily occurs corresponding to increases in the content of alloy elements such as Cr, Mo, and V.

It is extremely difficult to prevent these crackings when the alloy elements are simply increased to improve strength. As mentioned above, it is very difficult to fabricate a steel pipe of the X 100 grade while ensuring strength and toughness of the seam weld metal without these crackings, and an effective measure has not been obtained yet.

Disclosure of the Invention

In view of the above circumstances, the present invention is aimed at providing a method of fabricating a large-diameter welded steel pipe which has high strength of the X 100 grade and high toughness with a Charpy impact test absorbed energy, $_vE_{-20}$, of 80 J or more at −20° C.

According to the present invention, a large-diameter welded steel pipe, which has high strength of the X 100 grade and high toughness with a $_vE_{-20}$ value of 80 J or more at −20° C., can be fabricated by restricting the chemical composition of steel plate and weld metal which have resulted from the internal and external 1-pass submerged arc welding conducted after forming the steel plate.

Results of experiments, as the base of the present invention, will be explained.

To produce welded joints, X 100 grade steel plate of 20 mm thick with X groove were subjected to one-pass submerged arc welding (3 electrodes; weld speed at 1,200/min) from the both sides using a low-oxygen welding flux and a low-carbon welding wire which contains a variable quantity of Ti. Micro-structure observation, the Charpy impact test, and a tensile test were conducted on the weld metal. The test specimens were machined such that the fusion line of the weld metals in a perpendicular cross section to the welding direction located in the center.

Figure 1:
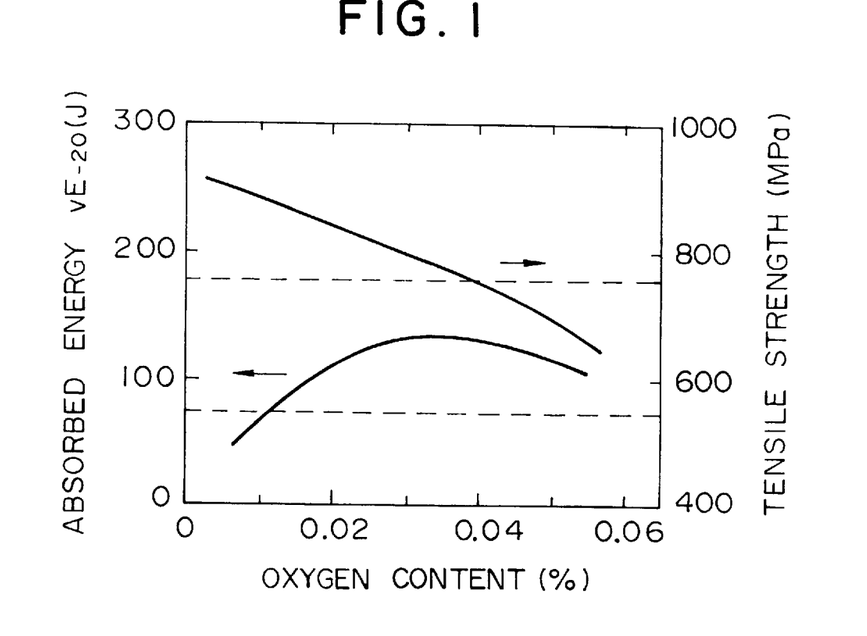
FIG. 1 is a graph showing the relationship between the oxygen content of weld metal and the tensile strength, and absorbed energy ($_vE_{-20}$) at –20° C.

FIG. 1 shows the relationship between the oxygen content of weld metal and strength and toughness of the weld metal. When the oxygen content of the weld metal increases, inclusion of the weld metal is raised, thus decreasing strength and toughness of the weld metal. Furthermore, if the oxygen content is exceedingly low, toughness of the weld metal decreases. Therefore, the oxygen content of the weld metal is required to be in a range of 0.011 to 0.038%. It is well known that the oxygen content of weld metal has a close relationship with a welding flux and, according to the present invention, a low-oxygen welding flux is employed for setting the oxygen content of weld metal to the appropriate value.

Figure 2:
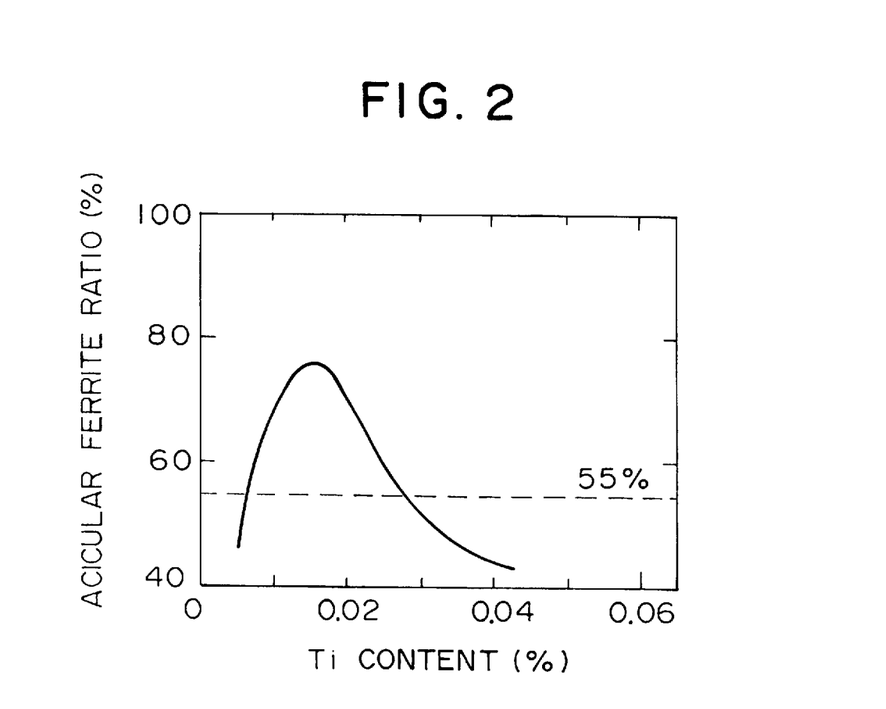
FIG. 2 is a graph showing the relationship between the Ti content of weld metal and the quantity of acicular ferrite.

FIG. 2 shows the relationship between Ti content of weld metal and the ratio of acicular ferrite.

Figure 3:
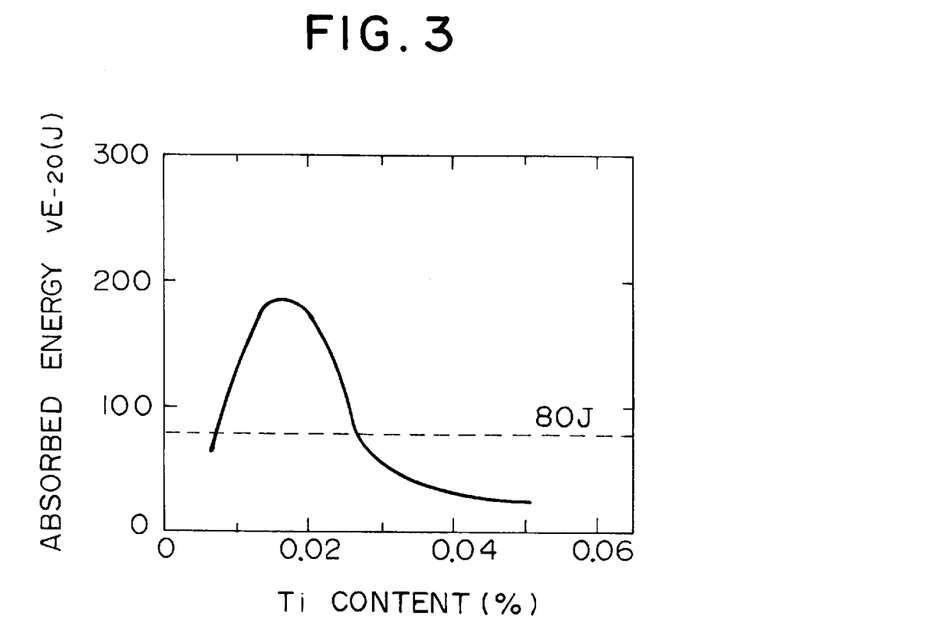
FIG. 3 is a graph showing the relationship between the Ti content of weld metal and absorbed energy ($_vE_{-20}$) at –20° C.

FIG. 3 shows the relationship between Ti content of weld metal and the $_vE_{-20}$ value.

It is understood from FIG. 2 that the quantity of acicular ferrite increases with addition of a trace quantity of Ti so that the micro-structure of the weld metal can essentially consist of acicular ferrite, and moreover, it is apparent from FIGS. 2 and 3 that the ratio of acicular ferrite reaches 55% or more by setting the Ti content between 0.007 and 0.028%, thereby achieving a high toughness with a $_vE_{-20}$ value of 80 J or more. Each yield strength is similar to the X 100 grade strength.

In other words, although conventional steel pipes of up to the X 70 grade are required to contain a large quantity of Ti for generating acicular ferrite, an acicular ferrite structure is achieved by addition of a trace quantity, 0.007% or more, of Ti and high toughness is also obtained in the X 100 grade steel pipes. However, if the content exceeds 0.028%, the toughness deteriorates. As mentioned above, it was found that the Ti and O contents of weld metal of X 100 grade had certain optimum ranges. However, the toughness deteriorated in some cases even when the Ti or O content was in the above optimum range.

Figure 4:
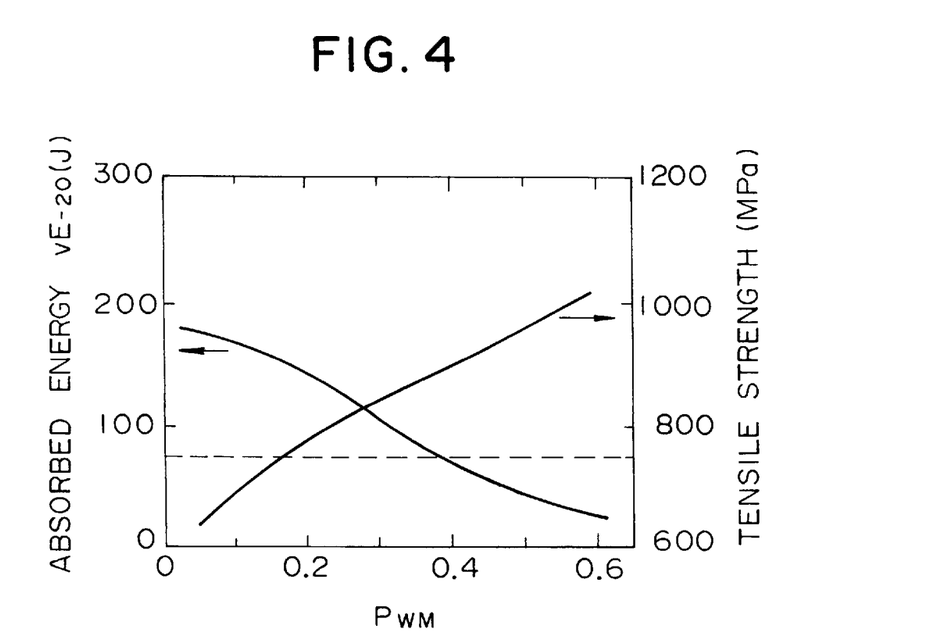
FIG. 4 is a graph showing the relationship between the $P_{WM}$ value of weld metal and tensile strength, and absorbed energy ($_vE_{-20}$) at –20° C.

It is well known that the strength and toughness of weld metal vary according to the quantities of alloy elements contained therein and the quantities of alloy elements are often evaluated by using the $P_{cm}$ value, however, the inventors of the present invention paid attention to the fact that Ti and O have large influences besides as elements affecting the $P_{cm}$ value, and have found that toughness increased despite high strength only when a parameter was in an appropriate range, which parameter was regulated by Ti, O, and other alloy elements and not regulated by Ti and O individually. In other words, the inventors of the present invention have novelly found that weld metal having high strength of X 100 grade and high toughness, $_vE_{-20}$ value of 80 J or more, can be obtained only when Pwm=Pcm+3.19 Ti–1.02 O was between 0.18 and 0.33, as is shown in FIG. 4.

In other words, the present invention is a method of fabricating a high strength and high toughness large-diameter welded steel pipe having the steps of: performing UO forming processing of a steel plate which comprises: by weight %, 0.05 to 0.10% of C; 0.1 to 0.5% of Si; 1.2 to 2.5% of Mn; not more than 0.010% of P; not more than 0.008% of S; not more than 0.1% of Al; 0.008 to 0.055% of Ti; not more than 0.1% of Nb; not more than 0.1% of V; not more than 0.010% of N; not more than 0.0035% of O; one or more elements selected from the group consisting of not more than 0.2 to 2.0% of Cu, 0.2 to 2.0% of Ni, 0.2 to 2.0% of Cr, and 0.05 to 2.0% of Mo; and the balance being Fe and unavoidable impurities; performing 1-pass submerged arc welding conducted from the inner side and then from the outer side using a low-oxygen welding flux and a low carbon welding wire; and expanding the diameter of the steel pipe; in which weld metal obtained by the 1-pass submerged arc welding contains: by weight %, 0.02 to 0.10% of C; 0.1 to 0.6% of Si; 1.0 to 2.7% of Mn; not more than 0.02% of P; not more than 0.02% of S; not more than 0.02% of Al; 0.007 to 0.028% of Ti; not more than 0.1% of V; not more than 0.06% of Nb; not more than 0.01% of N; 0.011 to 0.038% of O; one or more elements selected from the group consisting of not more than 1.0% of Cu, not more than 2.0% of Ni, not more than 1.0% of Cr, not more than 1.0% of Mo, and not more than 0.01% of B with a $P_{WM}$ value as set below ranging from 0.18 to 0.33; and the balance being Fe and unavoidable impurities; and the weld metal has a micro-structure containing acicular ferrite of not less than 55% by area ratio:

$P_{WM}=P_{cm}+3.19Ti-1.020$, and $P_{cm}=C+Si/30+(Mn+Cu+Cr)/20+Ni/60+Mo/15+V/10+5B$ Moreover, the present invention is a method of fabricating a high strength and high toughness large-diameter welded steel pipe having the steps of: performing UO forming processing of a steel plate which contains: by weight %, 0.05 to 0.10% of C; 0.1 to 0.5% of Si; 1.2 to 2.5% of Mn; not more than 0.010% of P; not more than 0.008% of S; not more than 0.1% of Al; 0.008 to 0.055% of Ti; not more than 0.1% of Nb; not more than 0.1% of V; not more than 0.010% of N; not more than 0.0035% of O; one or more elements selected from the group consisting of not more than 0.2 to 2.0% of Cu, 0.2 to 2.0% of Ni, 0.2 to 2.0% of Cr, and 0.05 to 2.0% of Mo; and the balance being Fe and unavoidable impurities; performing 1-pass submerged arc welding conducted from the inner side and then from the outer side using a low-oxygen welding flux and a low carbon welding wire; and expanding the diameter of the steel pipe; in which weld metal obtained by the 1-pass submerged arc welding contains: by weight %, 0.02 to 0.10% of C; 0.1 to 0.6% of Si; 1.0 to 2.7% of Mn; not more than 0.02% of P; not more than 0.02% of S; not more than 0.02% of Al; 0.007 to 0.028%. of Ti; not more than 0.1% of V; not more than 0.06% of Nb; not more than 0.01% of N; 0.011 to 0.038% of O; one or more elements selected from the group consisting of not more than 1.0% of Cu, not more than 2.0% of Ni, not more than 1.0% of Cr, not more than 1.0% of Mo, and not more than 0.01% of B with a $P_{WM}$ value as set below ranging from 0.18 to 0.33 and a $P_{rh}$ value as set below being less than 2.8; and the balance being Fe and unavoidable impurities; and the weld metal has a micro-structure containing acicular ferrite of not less than 55% by area ratio:

$P_{WM} = P_{cm} + 3.19Ti - 1.020$, and $P_{cm} = C + Si/30 + (Mn + Cu + Cr)/20 + Ni/60 + Mo/15 + V/10 + 5B$ $P_{rh} = Cr + Cu + Ni + 2Mo + 10V + 7Nb + 5Ti$

BEST MODE FOR CARRYING OUT THE INVENTION

First, the reason why the chemical composition of a steel plate used for the present invention was restricted will be explained.

C: 0.05 to 0.10%

C is one of the most important elements for ensuring the strength of steel plate and the required strength cannot be obtained if the C. content is less than 0.05%. However, if the content exceeds 0.10%, the carbon content of welded joints increases and, as a result, the welded joints readily crack and the toughness of the welded joints deteriorates, thus the C. content is set in a range of 0.05 to 0.10%.

Si: 0.1 to 0.5%

Si is an element needed for deoxidation and at least 0.1% of Si is necessary. However, when the content exceeds 0.5% the toughness of the base metal deteriorates, thus the Si content is set in a range of from 0.1 to 0.5%.

Mn: 1.2 to 2.5%

Mn is one of the most important elements for ensuring the strength of steel plate and weld metal, and at least 1.2% of Mn is necessary to obtain the X 100 grade strength. However, if the content exceeds 2.5%, hot cracking readily occurs in the welded joints, thus the Mn content is set in a range of 1.2 to 2.5%.

P: not more than 0.010%

P accelerates center segregation and allows hot cracking to readily occur in the welded joints, thus the P content should be as low as possible. However, since no more than 0.010% of P is permissible, the upper limit is set to 0.010%.

S: not more than 0.008%

S generates inclusions and reduces ductility and toughness. Furthermore, this element allows hot cracking to readily occur in welded joints, thus the S content should be as low as possible. Not more than 0.008% of S is permissible, however toughness of the base metal deteriorates and hydrogen induced cracking readily occurs if the S content exceeds 0.008%, thus the upper limit is set to 0.008%.

Al: not more than 0.1%

Al serves as a deoxidizer and refines grains, however, if the Al content exceeds 0.1%, toughness of weld heat affected zone deteriorates and the sulphide stress corrosion cracking sensitivity increases, therefore the upper limit is set to 0.1%.

Ti: 0.008 to 0.055%

Ti forms fine TiN. in steel and suppresses austenitegrain growth, thus improving the toughness of the base metal and weld heat affected zone. Therefore, at least 0.008% of Ti is necessary. However when more than 0.055% of Ti is contained, Ti carbide which deteriorates the toughness is formed, thus the upper limit is set to 0.055%.

Nb: not more than 0.1%

Nb is an element required for ensuring the strength of base metal and is also required for obtaining excellent toughness of weld heat affected zone; however, toughness of the base metal deteriorates when more than 0.1% of Nb is added, thus the upper limit is set to 0.1%. In view of ensuring toughness of the base metal, Nb had better be contained in a range of from 0.01 to 0.05%.

V: not more than 0.1%.

V is contained for ensuring the strength of base metal; however, toughness of the base metal deteriorates when more than 0.1% of V is added, thus the upper limit is set to 0.1%. Preferred range of the V content is from 0.01 to 0.05%.

N: not more than 0.010%

When the N content exceeds 0.010%, the quantity of N penetrating into weld metal from the base metal increases so that the N content of the weld metal is raised, deteriorating toughness of the weld metal; thus the upper limit is set to 0.010%. Preferably, the content is not more than 0.004%.

O: not more than 0.0035%

O is an element which forms inclusions and deteriorates the toughness of steel plate, thus it is preferable to reduce the O content. When the content exceeds 0.0035%, sulphide stress corrosion cracking readily occurs besides the fact that toughness of the base metal deteriorates; thus the upper limit is set to 0.0035%.

In addition to the above basic components, the following elements may be added as optional components:

Cu: 0.2 to 2.0%

Cu is an important element in view of improving strength and is added as occasion demands. Effects on improving strength is expected when Cu is added at 0.2% or more. However, when the content exceeds 2.0%, toughness deteriorates; thus the upper limit is set to 2.0%.

Ni: 0.2 to 2.0%

Ni is an element improving both strength and toughness, and added as occasion demands. Effects on improving strength and toughness are expected when Ni is added at 0.2% or more, and when the content exceeds 2.0%, hot cracking readily occurs in weld metal due to dilution of the base metal; thus the upper limit is set to 2.0%.

Cr: 0.2 to 2.0%

Cr is an important element in view of improving strength. Addition of not less than 0.2% of Cr is necessary to improve strength. However, when more than 2.0% of Cr is added, toughness deteriorates; thus the Cr content is set in a range of from 0.2 to 2.0%.

Mo: 0.05 to 2.0%

Mo is an important element in view of improving strength. Addition of not less than 0.05% of Mo is necessary to improve strength. However, when more than 2.0% of Mo is added, toughness deteriorates; thus the Mo content is set in a range of from 0.05 to 2.0%.

According to the present invention, a steel plate having the above composition is formed in a pipe shape by U-forming processing and O-forming processing, then a seam portion is one-pass welded by submerged arc welding conducted from the inner side and then from the outer side using a low-oxygen welding flux and a low-carbon welding wire. The resulting pipe is then expanded to obtain a large-diameter welded steel pipe. Pipe-shape forming is carried out using a general UO forming processing apparatus.

It is desirable that one-pass submerged arc welding with a multi-electrode system (preferably using 3 to 4 electrodes) be employed to improve welding efficiency. X groove is preferable and the dilution of the base metal in the weld metal is preferably set from approximately 50 to 75%.

In addition, a low-oxygen welding flux is employed as the welding flux. It is extremely important to control oxygen content of the weld metal for obtaining weld metal satisfying the present invention. When the oxygen content of weld metal is raised, the strength of the weld metal is reduced. Furthermore, when the oxygen content increases, inclusions in the weld metal increase. Meanwhile, toughness of the weld metal is reduced when the oxygen content is exceedingly low; therefore, considering the balance of the above relationship, a welding flux arranging the oxygen content of weld metal in a range of from 0.011 to 0.038% is selected.

In particular, welding fluxes having the following composition ranges are preferably used for the present invention: For example, for welding steel pipes of X-100 grade, low-oxygen welding fluxes composed of 20 to 35% of $SiO_2$, 3 to 10% of MnO, 10 to 25% of CaO, 2 to 7% of MgO, 25 to 40% of $CaF_2$, 3 to 14% of $Al_2O_3$, and 0 to 5% of BaO are particularly preferable. Moreover, a required quantity of alloy element may be added to the welding flux so that the weld metal contains the alloy element.

In particular, low-carbon welding wires containing Ni, Cr, and Mo are employed as the welding wire. In the present invention, by restricting the chemical composition of weld metal to a specific range, production of large-diameter welded steel pipes is enabled, which pipes, including welded joints thereof, have high strength and high toughness. The chemical composition of weld metal is determined by steel plates, welding wires, welding fluxes, and welding conditions, and cannot be determined by welding wires alone; however, the desirable chemical composition of weld wire is as follows: 0.01 to 0.10% of C, not more than 0.5% of Si, 1.2 to 3.5% of Mn, not more than 0.02% of P, not more than 0.02% of S, not more than 4.0% of Ni, not more than 1.5% of Cr, not more than 1.5% of Mo, not more than 0.15% of Ti, not more than 0.01% of N, and not more than 0.01% of O. The reason why the composition was restricted to the above will be explained below:

C: 0.01 to 0.10%

C is one of the most important elements for ensuring the strength of weld metal and the required strength cannot be obtained if the C content is less than 0.01%. However, when the content exceeds 0.10%, the carbon content of weldments increases and, as a result, the weldments readily crack and toughness of the weldments deteriorates, thus the C content is preferably in a range of from 0.01 to 0.10%.

Si: not more than 0.5%

When more than 0.5% of Si is added, the weld metal readily cracks, thus the upper limit is set to 0.5%.

Mn: 1.2 to 3.5%

Mn is one of the most important elements for ensuring the strength of weld metal and at least 1.2% of Mn is necessary to obtain the X 100 grade strength. However, if the content exceeds 3.5%, hot cracks readily occur in weld metal, thus the content is preferably in a range of from 1.2 to 3.5%.

P and S: not more than 0.02%

Both P and S serve as impurities, thus the contents thereof are preferably small; however up to 0.02% is permissible.

Ni: not more than 4.0%

Ni is an element improving both strength and toughness of weld metal. However, when the Ni content exceeds 4.0%, hot cracking readily occurs in welded joints, thus the preferred upper limit is 4.0%. Furthermore, the Ni content is preferably in a range of from 0.2 to 1.5%.

Cr: not more than 1.5%

Cr is an important element in view of improving strength of weld metal, however, when more than 1.5% of Cr is added, the cracking sensitivity increases because of a rise in hardenability; thus the preferred upper limit is 1.5%. Furthermore, the Cr content is preferably in a range of from 0.1 to 0.6%.

Mo: not more than 1.5%

Mo is an important element in view of improving strength of weld metal, however, when more than 1.5% of Mo is added, the cracking sensitivity increases because of a rise in hardenability; thus the preferred upper limit is 1.5%. Furthermore, the Mo content is preferably in a range of from 0.1 to 0.5%.

Ti: not more than 0.15%

Ti is one of the most important elements for ensuring the strength and toughness of weld metal and is an indispensable element to obtain weld metal of X 100 grade. By addition of Ti, the micro-structure of weld metal is dominated by acicular ferrite. However, when the Ti content exceeds 0.15%, toughness deteriorates, thus the Ti content of not more than 0.15% is preferred. At least 0.01% of Ti is necessary to form an acicular ferrite structure, therefore, the preferred range for Ti is from 0.01 to 0.07%.

N: not more than 0.01%

Since N deteriorates toughness of weld metal, the N content of wire is preferably not more than 0.01%.

O: not more than 0.01%

O has a close relationship with strength and toughness of weld metal, however, the oxygen content of weld metal is mainly determined by welding flux, thus the oxygen content of welding wire causes no problem so long as it is 0.01% or less.

The reason why the chemical composition of weld metal obtained by submerged arc welding using the abovementioned welding flux and welding wire was restricted will be explained below:

C: 0.02 to 0.10%

C is one of the most important elements for ensuring the strength of weld metal and the required strength cannot be obtained if the C. content is less than 0.02%. However, when the content exceeds 0.10%, the carbon content of weld metal increased and, as a result, the weld metal readily cracks and the toughness of the weld metal deteriorates, thus the C content is set in a range of from 0.02 to 0.10%.

Si: 0.1 to 0.6%

Although Si contributes to improving strength of weld metal, an exceedingly large Si content deteriorates toughness of weld metal; thus the content is set in a range of from 0.1 to 0.6%.

Mn: 1.0 to 2.7%

Mn is one of the most important elements for ensuring the strength of weld metal and at least 1.0% of Mn is necessary to obtain the X 100 grade strength. However, if the content exceeds 2.7%, hot cracking readily occurs in weld metal, thus the content is set in a range of from 1.0 to 2.7%.

P: not more than 0.02%

P is an impurity, thus the content thereof is preferably small; however, since up to 0.02% of P is permissible, the upper limit is set to 0.02%.

S: not more than 0.02%

S is an impurity, thus the content thereof is preferably small; however, since up to 0.02% of S is permissible, the upper limit is set to 0.02%.

Al: not more than 0.02%

Al serves as a deoxidizer for weld metal, however, if the Al content exceeds 0.02%, toughness of weld metal deteriorates; therefore the content is set to no more than 0.02%.

Ti: 0.007 to 0.028%

Ti is an important element for ensuring the strength and toughness of weld metal. Addition of a trace amount of Ti is indispensable to allow the weld metal to form a microstructure essentially consisting of acicular ferrite. The above mentioned micro-structure can be formed by addition of 0.007% or more of Ti. However, when the Ti content exceeds 0.028%, there occurs an increase in bainite structure in the weld metal because of an excessive amount of Ti, thereby deteriorating toughness. Thus, the Ti content is set in a range of from 0.007 to 0.028%.

V: not more than 0.1%.

V is an element useful for improvement in strength of weld metal, however, toughness deteriorates due to increasing hardenability of weld metal when the V content exceeds 0.1%, thus the upper limit is set to 0.1%.

Nb: not more than 0.06%

Weld metal obtains Nb not from welding materials but from dilution of the base metal; and a small Nb content is preferable in view of ensuring toughness of the weld metal, thus the upper limit is set to 0.06%. Furthermore, since a significant increase in strength is expected when 0.01% or more of Nb is contained, the preferred range for the Nb content is from 0.01 to 0.03%.

N: not more than 0.01%

Since N deteriorates toughness of weld metal, the N content is preferably small; however, the upper limit is set to 0.1% because up to 0.01% of N is permissible.

O: 0.011 to 0.038%

O largely affects strength and toughness of weld metal. When the O content is less than 0.011%, toughness of weld metal is reduced and when the content exceeds 0.038%, inclusions in weld metal increase, thereby deteriorating toughness; thus the oxygen content is set in a range of from 0.011 to 0.038%.

One or more elements selected from the group consisting of not more than 1.0% of Cu, not more than 2.0% of Ni, not more than 1.0% of Cr, not more than 1.0% of Mo, and not more than 0.01% of B Cu, Ni, Cr, Mo, and B are useful elements for improving strength of weld metal and added to weld metal according to necessity. Moreover, when higher cracking resistance is required, the quantities of elements which are optionally added are severely restricted.

Although 0.3% or more of Cu significantly improves strength, solidification cracking extremely readily occurs in weld metal if the Cu content exceeds 1.0%, thus the content is set to no more than 1.0%. The content is preferably in a range of from 0.3 to 1.0%. When highly considering cracking resistance, it is desirable to minimize the Cu addition. The preferred Cu content is not more than 0.5% in view of cracking resistance.

Although 0.4% or more of Ni significantly improves strength, hot cracking and sulphide stress corrosion cracking readily occur in weld metal if the Ni content exceeds 2.0%, thus the content is set to no more than 2.0%. The content is preferably in a range of from 0.4 to 1.2%. When highly considering cracking resistance, it is desirable to minimize the Ni addition. The preferred Ni content is in a range of from 0.2 to 0.8% in view of cracking resistance.

Although 0.1% or more of Cr significantly improves strength, toughness deteriorates if the Cr content exceeds 1.0%, thus the content is set to no more than 1.0%. The content is preferably in a range of from 0.1 to 0.5%. When highly considering cracking resistance, it is desirable to minimize the Cr addition. The preferred Cr content is not more than 0.3% in view of cracking resistance.

Although 0.05% or more of Mo significantly improves strength, toughness deteriorates if the Mo content exceeds 1.0%, thus the content is set to no more than 1.0%. The content is preferably in a range of from 0.2 to 0.9%. When highly considering cracking resistance, the preferred Mo range is from 0.05 to 0.8% because 0.8% or more of Mo increases cracking sensitivity.

Although 0.001% or more of B significantly improves strength, toughness deteriorates if the B content exceeds 0.01%, thus the content is set to no more than 0.01%. The content is preferably in a range of from 0.001 to 0.005%.

The area ratio of acicular ferrite in the micro-structure of the weld metal is set to no less than 55%. When the area ratio of acicular ferrite is above 55%, high toughness is achieved even if the strength of weld metal is as high as the X 100 grade, meanwhile toughness deteriorates if the ratio is less than 55%; thus the lower limit is set to 55%.

$P_{WM}$, which is defined as $P_{WM}=P_{cm}+3.19Ti-1.020$, is set in a range of from 0.18 to 0.33. $P_{cm}$ is defined by the following equation:

$$P_{cm}=C+Si/30+(Mn+Cu+Cr)/20+Ni/60+Mo/15+V/10+5B$$

In the above formulae, the values of C, Si, etc. are indicated by wt %.

$P_{WM}$ is an index from which strength and toughness can be estimated. When the $P_{WM}$ value is less than 0.18, the strength of weld metal is insufficient such that it does not attain the X 100 grade strength, and when the $P_{WM}$ value exceeds 0.33 toughness deteriorates; thus the $P_{WM}$ value is set in a range of from 0.18 to 0.33.

When cracking resistance is required, the chemical composition of weld metal, in which cracking particularly readily occurs, is restricted such that the cracking sensitivity parameter $P_{rh}$ defined by the following equation is set to less than 2.8:

$$P_{rh}=Cr+Cu+Ni+2Mo+10V+7Nb+5Ti$$

Figure 5:
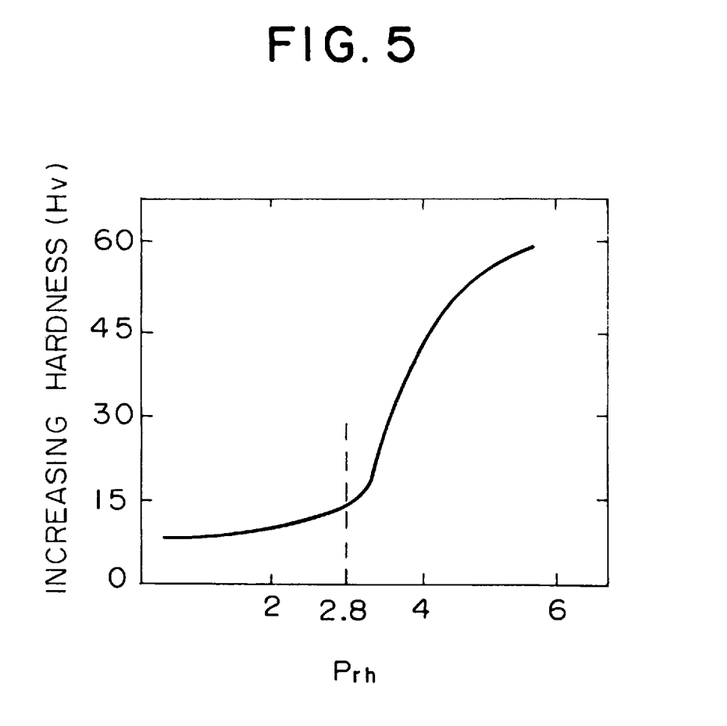
FIG. 5 is a graph showing the relationship between increasing hardness and the cracking sensitivity parameter $P_{rh}$.

In the seam weld protion, the internal weld metal is hardened due to external welding and readily cracks. According to the present invention, the chemical composition of weld metal is restricted by setting the $P_{rh}$ value to less than 2.8. Increasing hardness is reduced and cracking sensitivity is suppressed by setting the $P_{rh}$ value to less than 2.8, as is shown in FIG. 5.

EXAMPLE

Steel plates 20 mm thick, each having a composition shown in Table 1 were subjected to U-pressing and O-pressing; seam welding was conducted on the inner side and then the outer side of each plate by 4-electrode submerged arc welding using a low-carbon welding wire shown in Table 2 and low-oxygen high-base fluxes shown in Table 3 under the welding conditions shown in Table 4; and then the resulting pipes were expanded to produce large-diameter welded steel pipes with an inner diameter of 750 mm. Metal powder was mixed in the welding fluxes so as to adjust the chemical composition of weld metals.

Chemical composition of the weld metal of each seam weld metal was investigated by collecting samples from the center portion of the internal weld metal. The results are shown in Table 5. In addition, test specimens for a tensile test (6 mm φ of JIS No. A2 sample) and a impact test (JIS No. 4) were collected from the weld metal of each seam welded joint to measure the tensile strength and absorbed energy at −20° C.; the results are shown in Table 6. Furthermore, samples were collected from each weld metal to examine the micro-structure of the weld metal by light-microscopic observation conducted on a cross sectional face, and moreover, cross sectional hardness of each weld metal at the center of the internal weld bead was measured (Vickers hardness at 10 kg load) so as to obtain a maximum hardness; the results are shown in Table 6.

The weld metals of the present invention satisfy both $_vE_{-20}$ values of not less than 80 J and tensile strengths of not less than 760 MPa, and have sufficient characteristics for the X 100 grade. In addition, the weld metals of the present invention have low $Hv_{max}$ values and low cracking sensitivities.

Furthermore, the chemical compositions of weld metals according to the comparative examples are out of the range of the present invention, and these weld metals have either $_vE_{-20}$ values of less than 80 J or tensile strengths of less than 760 MPa, thus they are inappropriate as welded joints of the X 100 grade steel pipes. The maximum hardness of welded joints in the comparative examples are high, even though strength and toughness are excellent.

As is explained in the above, according to the present invention, a large-diameter welded steel pipe simultaneously having the X-100 grade strength and excellent low-temperature toughness can be fabricated, resulting in significant industrial effects such that line-pipes which can be used as pipelines placed under severe circumstances can be reliably supplied.

TABLE 1

| Steel type | C | Si | Mn | P | S | Nb | V | Cu | Al | Ni | Cr | Mo | Ti | N | O | YS | TS | El | vTrs |
|---|---|---|---|---|---|---|---|---|---|---|---|---|---|---|---|---|---|---|---|
| A | 0.06 | 0.30 | 1.80 | 0.008 | 0.001 | 0.060 | 0.010 | — | 0.040 | 0.50 | 0.20 | 0.50 | 0.020 | 0.0040 | 0.0025 | 853 | 891 | 25 | −63 |
| B | 0.08 | 0.40 | 2.10 | 0.009 | 0.001 | 0.010 | 0.010 | 0.50 | 0.040 | 0.90 | 0.30 | 0.20 | 0.030 | 0.0038 | 0.0022 | 897 | 912 | 23 | −56 |
| C | 0.05 | 0.30 | 2.00 | 0.008 | 0.001 | 0.040 | 0.040 | — | 0.030 | 0.80 | 0.40 | 0.70 | 0.010 | 0.0041 | 0.0020 | 886 | 921 | 24 | −56 |
| D | 0.06 | 0.30 | 2.10 | 0.007 | 0.001 | 0.060 | 0.010 | 0.20 | 0.040 | 1.20 | — | — | 0.020 | 0.0042 | 0.0025 | 844 | 876 | 27 | −61 |
| E | 0.08 | 0.40 | 2.00 | 0.008 | 0.001 | 0.010 | 0.010 | — | 0.040 | — | 0.60 | — | 0.010 | 0.0040 | 0.0021 | 852 | 885 | 29 | −63 |
| F | 0.06 | 0.30 | 2.10 | 0.008 | 0.001 | 0.040 | 0.010 | — | 0.030 | — | — | 0.80 | 0.010 | 0.0035 | 0.0023 | 863 | 895 | 27 | −62 |

(MPa) (MPa) (%) (°C.)

TABLE 2

| Wire No. | C | Si | Mn | P | S | Al | Ni | Cr | Mo | Ti | N | O | B | Wire diameter (mm) |
|---|---|---|---|---|---|---|---|---|---|---|---|---|---|---|
| a | 0.05 | 0.10 | 1.20 | 0.010 | 0.001 | 0.040 | 1.00 | 0.30 | 0.10 | 0.010 | 0.004 | 0.002 | 0.0050 | 4.0 |

TABLE 3

| Flux No | SiO$_2$ | MnO | CaO | MgO | CaF$_2$ | C | Added alloy elements | | |
|---|---|---|---|---|---|---|---|---|---|
| | | | | | | | Ni | Cr | Mo |
| (i) | 35 | 10 | 26 | — | 30 | 0.1 | 1.0 | — | — |
| (ii) | 30 | 5 | 25 | 5 | 30 | 0.1 | — | 1.0 | — |
| (iii) | 25 | 5 | 20 | 5 | 40 | 0.1 | — | 0.3 | 0.5 |

TABLE 4

| Welding Conditions | Groove | | Inner side welding | | | | Outer side welding | | | |
|---|---|---|---|---|---|---|---|---|---|---|
| A | Double U | Electrode No. | 1 | 2 | 3 | 4 | 1 | 2 | 3 | 4 |
| | | Current (A) | 1050 | 820 | 640 | 550 | 1130 | 940 | 790 | 600 |
| | | Voltage (V) | 35 | 38 | 38 | 38 | 35 | 38 | 38 | 38 |
| | | Weld speed (mm/min) | 1700 | | | | 1750 | | | |
| B | Double U | Electrode No. | 1 | 2 | 3 | 4 | 1 | 2 | 3 | 4 |
| | | Current (A) | 1100 | 930 | 770 | 620 | 1150 | 940 | 790 | 600 |
| | | Voltage (V) | 35 | 38 | 38 | 38 | 35 | 38 | 38 | 38 |
| | | Weld speed (mm/min) | 1800 | | | | 1800 | | | |

TABLE 5

| No. | Steel plate | Flux | Welding conditions | Weld meta composition (wt %) Note | | | | | | | |
|---|---|---|---|---|---|---|---|---|---|---|---|
| | | | | C | Si | Mn | P | S | Nb | V | Cu |

Example of present invention

| No. | Steel plate | Flux | Welding conditions | C | Si | Mn | P | S | Nb | V | Cu |
|---|---|---|---|---|---|---|---|---|---|---|---|
| 1 | A | iii | A | 0.05 | 0.29 | 1.82 | 0.012 | 0.005 | 0.040 | 0.005 | 0.11 |
| 2 | B | ii | A | 0.07 | 0.30 | 1.90 | 0.012 | 0.005 | 0.010 | 0.030 | 0.30 |
| 3 | A | iii | A | 0.08 | 0.11 | 2.50 | 0.011 | 0.005 | 0.040 | 0.005 | 0.30 |
| 4 | A | ii | A | 0.06 | 0.30 | 2.00 | 0.011 | 0.005 | 0.040 | 0.005 | 0.28 |
| 5 | C | iii | B | 0.05 | 0.10 | 2.60 | 0.013 | 0.008 | 0.030 | 0.008 | 0.20 |
| 6 | B | i | A | 0.05 | 0.53 | 1.51 | 0.013 | 0.008 | 0.010 | 0.030 | 0.30 |
| 7 | B | i | A | 0.05 | 0.40 | 1.60 | 0.011 | 0.005 | 0.010 | 0.030 | 0.31 |
| 8 | B | i | A | 0.04 | 0.30 | 1.77 | 0.011 | 0.005 | 0.010 | 0.030 | 0.30 |
| 9 | A | iii | A | 0.06 | 0.31 | 1.10 | 0.010 | 0.005 | 0.040 | 0.005 | 0.11 |
| 10 | A | iii | B | 0.08 | 0.30 | 1.30 | 0.010 | 0.005 | 0.040 | 0.005 | 0.11 |
| 11 | B | iii | A | 0.06 | 0.31 | 2.50 | 0.010 | 0.010 | 0.010 | 0.030 | 0.30 |
| 12 | B | ii | A | 0.05 | 0.31 | 2.70 | 0.010 | 0.010 | 0.010 | 0.029 | 0.10 |
| 13 | C | i | A | 0.05 | 0.42 | 1.40 | 0.010 | 0.006 | 0.020 | 0.020 | 0.10 |
| 14 | C | ii | A | 0.05 | 0.42 | 1.77 | 0.010 | 0.006 | 0.020 | 0.020 | 0.10 |
| 15 | A | i | B | 0.08 | 0.20 | 2.00 | 0.012 | 0.008 | 0.040 | 0.010 | 0.29 |
| 16 | A | i | A | 0.07 | 0.30 | 1.70 | 0.012 | 0.006 | 0.040 | 0.010 | 0.29 |

Comparative example weld meta composition (wt %)

| No. | Steel plate | Flux | Welding conditions | C | Si | Mn | P | S | Nb | V | Cu |
|---|---|---|---|---|---|---|---|---|---|---|---|
| 17 | B | ii | A | 0.06 | 0.30 | 1.85 | 0.012 | 0.006 | 0.010 | 0.006 | 1.10 |
| 18 | E | ii | B | 0.05 | 0.30 | 1.85 | 0.012 | 0.007 | 0.020 | 0.020 | 0.10 |
| 19 | F | i | A | 0.05 | 0.30 | 1.40 | 0.011 | 0.006 | 0.040 | 0.006 | 0.10 |
| 20 | B | i | A | 0.08 | 0.36 | 1.76 | 0.012 | 0.006 | 0.010 | 0.040 | 0.30 |
| 21 | A | iii | A | 0.06 | 0.36 | 1.76 | 0.012 | 0.006 | 0.040 | 0.011 | 0.31 |
| 22 | A | i | A | 0.08 | 0.20 | 2.00 | 0.012 | 0.007 | 0.040 | 0.010 | 0.30 |
| 23 | B | i | B | 0.04 | 0.21 | 1.40 | 0.012 | 0.006 | 0.010 | 0.030 | 0.11 |
| 24 | A | i | A | 0.08 | 0.36 | 2.20 | 0.012 | 0.006 | 0.040 | 0.010 | 0.29 |
| 25 | D | i | A | 0.06 | 0.22 | 1.50 | 0.011 | 0.005 | 0.020 | 0.030 | 0.12 |
| 26 | A | i | A | 0.07 | 0.35 | 2.10 | 0.012 | 0.006 | 0.040 | 0.011 | 0.29 |

| No. | Weld meta composition (wt %) Note | | | | | | | | | | |
|---|---|---|---|---|---|---|---|---|---|---|---|
| | Al | Ni | Cr | Mo | Ti | B | N | O | $P_{CM}$ | $P_{WM}$ | $P_{rh}$ |

Example of present invention

| No. | Al | Ni | Cr | Mo | Ti | B | N | O | $P_{CM}$ | $P_{WM}$ | $P_{rh}$ |
|---|---|---|---|---|---|---|---|---|---|---|---|
| 1 | 0.005 | 0.79 | 0.21 | 0.41 | 0.019 | 0.0010 | 0.004 | 0.021 | 0.21 | 0.25 | 2.36 |
| 2 | 0.005 | 0.70 | 0.21 | 0.41 | 0.019 | 0.0020 | 0.004 | 0.025 | 0.25 | 0.29 | 2.50 |
| 3 | 0.005 | 0.30 | 0.10 | 0.39 | 0.021 | 0.0040 | 0.004 | 0.014 | 0.28 | 0.33 | 1.91 |
| 4 | 0.005 | 0.20 | 0.21 | 0.39 | 0.022 | 0.0010 | 0.004 | 0.025 | 0.23 | 0.27 | 1.91 |
| 5 | 0.008 | 0.70 | 0.30 | 0.57 | 0.017 | 0.0010 | 0.004 | 0.018 | 0.26 | 0.30 | 2.72 |
| 6 | 0.008 | 0.40 | 0.30 | 0.11 | 0.018 | 0.0050 | 0.004 | 0.035 | 0.21 | 0.24 | 1.68 |
| 7 | 0.005 | 0.81 | 0.10 | 0.11 | 0.013 | 0.0030 | 0.004 | 0.033 | 0.20 | 0.21 | 1.88 |
| 8 | 0.005 | 0.90 | 0.10 | 0.10 | 0.016 | 0.0010 | 0.004 | 0.032 | 0.19 | 0.21 | 1.95 |
| 9 | 0.005 | 0.40 | 0.28 | 0.37 | 0.028 | 0.0010 | 0.004 | 0.022 | 0.18 | 0.25 | 2.01 |
| 10 | 0.005 | 0.50 | 0.28 | 0.37 | 0.025 | 0.0010 | 0.004 | 0.019 | 0.21 | 0.27 | 2.09 |
| 11 | 0.010 | 0.80 | 0.23 | 0.10 | 0.011 | 0.0020 | 0.004 | 0.020 | 0.25 | 0.27 | 1.96 |
| 12 | 0.010 | 0.90 | 0.23 | 0.38 | 0.015 | 0.0010 | 0.004 | 0.028 | 0.26 | 0.28 | 2.43 |
| 13 | 0.006 | 0.10 | 0.27 | 0.20 | 0.012 | 0.0010 | 0.004 | 0.030 | 0.17 | 0.18 | 1.27 |
| 14 | 0.006 | 0.20 | 0.27 | 0.42 | 0.021 | 0.0020 | 0.004 | 0.026 | 0.21 | 0.25 | 1.85 |
| 15 | 0.006 | 1.00 | 0.06 | 0.42 | 0.012 | 0.0010 | 0.004 | 0.033 | 0.25 | 0.26 | 2.63 |
| 16 | 0.006 | 0.90 | 0.20 | 0.45 | 0.013 | 0.0010 | 0.004 | 0.028 | 0.24 | 0.25 | 2.74 |

Comparative example

Weld meta composition (wt %)

| No. | Al | Ni | Cr | Mo | Ti | B | N | O | $P_{CM}$ | $P_{WM}$ | $P_{rh}$ |
|---|---|---|---|---|---|---|---|---|---|---|---|
| 17 | 0.006 | 0.40 | 0.20 | 0.10 | 0.025 | 0.0020 | 0.004 | 0.024 | 0.25 | 0.31 | 2.16 |
| 18 | 0.006 | 0.60 | <u>1.20</u> | 0.20 | 0.023 | 0.0010 | 0.004 | 0.024 | 0.25 | 0.30 | 2.76 |
| 19 | 0.006 | 0.40 | 0.20 | <u>1.10</u> | 0.028 | 0.0010 | 0.004 | 0.029 | 0.23 | 0.29 | 3.38 |
| 20 | 0.006 | 0.30 | 0.06 | 0.30 | 0.007 | 0.0010 | 0.004 | 0.036 | 0.23 | 0.22 | <u>1.77</u> |
| 21 | 0.006 | 0.20 | 0.06 | 0.30 | 0.030 | 0.0010 | 0.004 | 0.019 | 0.21 | 0.28 | 1.71 |
| 22 | 0.006 | 1.00 | 0.06 | 0.62 | 0.012 | 0.0010 | 0.004 | 0.040 | 0.27 | 0.27 | 3.04 |
| 23 | 0.006 | 0.30 | 0.40 | 0.20 | 0.012 | 0.0010 | 0.004 | 0.036 | 0.17 | <u>0.17</u> | <u>1.64</u> |
| 24 | 0.006 | 0.32 | 0.06 | 0.90 | 0.025 | 0.0010 | 0.004 | 0.030 | 0.29 | <u>0.34</u> | 2.98 |
| 25 | 0.006 | <u>2.10</u> | 0.38 | 0.21 | 0.012 | 0.0010 | 0.004 | 0.035 | 0.22 | 0.23 | 3.52 |
| 26 | 0.006 | 0.32 | 0.07 | 0.77 | 0.023 | <u>0.0110</u> | 0.004 | 0.029 | 0.32 | <u>0.36</u> | <u>2.73</u> |

TABLE 6

| No. | TS (MPa) | vE$_{-20}$ (°C.) | AF ratio (%) | Maximum hardness of weld metal Hvmax | Note |
|---|---|---|---|---|---|
| 1 | 790 | 100 | 65 | 288 | Ex. of present inv. |
| 2 | 860 | 90 | 60 | 280 | Ex. of present inv. |
| 3 | 840 | 90 | 55 | 290 | Ex. of present inv. |
| 4 | 860 | 100 | 65 | 294 | Ex. of present inv. |
| 5 | 870 | 90 | 60 | 287 | Ex. of present inv. |
| 6 | 780 | 140 | 60 | 264 | Ex. of present inv. |
| 7 | 780 | 130 | 60 | 265 | Ex. of present inv. |
| 8 | 770 | 140 | 65 | 261 | Ex. of present inv. |
| 9 | 790 | 130 | 60 | 260 | Ex. of present inv. |
| 10 | 810 | 126 | 65 | 277 | Ex. of present inv. |
| 11 | 810 | 100 | 55 | 274 | Ex. of present inv. |
| 12 | 840 | 90 | 55 | 281 | Ex. of present inv. |
| 13 | 770 | 120 | 55 | 279 | Ex. of present inv. |
| 14 | 820 | 110 | 70 | 285 | Ex. of present inv. |
| 15 | 850 | 90 | 55 | 305 | Ex. of present inv. |
| 16 | 840 | 80 | 55 | 308 | Ex. of present inv. |
| 17 | 850 | 40 | 50 | 288 | Comp. ex. |
| 18 | 870 | 30 | 50 | 295 | Comp. ex. |
| 19 | 850 | 40 | 50 | 303 | Comp. ex. |
| 20 | 760 | 30 | 45 | 279 | Comp. ex. |
| 21 | 850 | 20 | 40 | 295 | Comp. ex. |
| 22 | 810 | 30 | 50 | 321 | Comp. ex. |
| 23 | 690 | 140 | 35 | 257 | Comp. ex. |
| 24 | 950 | 20 | 30 | 289 | Comp. ex. |
| 25 | 820 | 50 | 35 | 280 | Comp. ex. |
| 26 | 850 | 30 | 30 | 290 | Comp. ex. |

AF: Acicular Ferrite

We claim:

1. A method of fabricating a high strength and high toughness large-diameter welded steel pipe comprising the steps of:

performing UO forming processing of a steel plate, said steel plate comprising: by weight %, 0.05 to 0.10% of C; 0.1 to 0.5% of Si; 1.2 to 2.5% of Mn; not more than 0.010% of P; not more than 0.008% of S; not more than 0.1% of Al; 0.008 to 0.055% of Ti; not more than 0.1% of Nb; not more than 0.1% of V; not more than 0.010% of N; not more than 0.0035% of O; one or more elements selected from the group consisting of not more than 0.2 to 2.0% of Cu, 0.2 to 2.0% of Ni, 0.2 to 2.0% of Cr, and 0.05 to 2.0% of Mo; and the balance being Fe and unavoidable impurities;

performing one-pass submerged arc welding conducted from the inner side and then from the outer side using a low-oxygen welding flux and a low carbon welding wire; and expanding the diameter of said steel pipe;

wherein weld metal obtained by said 1-pass submerged arc welding contains: by weight %, 0.02 to 0.10% of C; 0.1 to 0.6% of Si; 1.0 to 2.7% of Mn; not more than 0.02% of P; not more than 0.02% of S; not more than 0.02% of Al; 0.007 to 0.028% of Ti; not more than 0.1% of V; not more than 0.06% of Nb; not more than 0.01% of N; 0.011 to 0.038% of O; one or more elements selected from the group consisting of not more than 1.0% of Cu, not more than 2.01 of Ni, not more than 1.0% of Cr, not more than 1.0% of Mo, and not more than 0.01% of B; a $P_{WM}$ value as set below ranging from 0.18 to 0.33; and the balance being Fe and unavoidable impurities; and said weld metal has a micro-structure containing acicular ferrite not less than 55% by area ratio:

$$P_{WM} = P_{cm} + 3.19Ti - 1.020, \text{ and}$$

$$P_{cm} = C + Si/30 + (Mn+Cu+Cr)/20 + Ni/60 + Mo/15 + V/10 + 5B.$$

2. A method of fabricating a high strength and high toughness large-diameter welded steel pipe comprising the steps of:

performing UO forming processing of a steel plate, said steel plate comprising: by weight %, 0.05 to 0.10% of C; 0.1 to 0.5% of Si; 1.2 to 2.5% of Mn; not more than 0.010% of P; not more than 0.008% of S; not more than 0.1% of Al; 0.008 to 0.055% of Ti; not more than 0.1% of Nb; not more than 0.1% of V; not more than 0.010% of N; not more than 0.0035% of O; one or more elements selected from the group consisting of not more than 0.2 to 2.0% of Cu, 0.2 to 2.0% of Ni, 0.2 to 2.0% of Cr, and 0.05 to 2.0% of Mo; and the balance being Fe and unavoidable impurities;

performing one-pass submerged arc welding conducted from the inner side and then from the outer side using a low-oxygen welding flux and a low carbon welding wire; and expanding the diameter of said steel pipe;

wherein weld metal obtained by said 1-pass submerged arc welding comprises: by weight %, 0.02 to 0.10% of C; 0.1 to 0.6% of Si; 1.0 to 2.7% of Mn; not more than 0.02% of P; not more than 0.02% of S; not more than 0.02% of Al; 0.007 to 0.028% of Ti; not more than 0.1% of V; not more than 0.06% of Nb; not more than 0.01% of N; 0.011 to 0.038% of O; one or more elements selected from the group consisting of not more than 1.0% of Cu, not more than 2.0% of Ni, not more than 1.0% of Cr, not more than 1.0% of Mo, and not more than 0.01% of B; a $P_{WM}$ value as set below ranging from 0.18 to 0.33 and a $P_{rh}$ value as set below being less than 2.8; and the balance being Fe and unavoidable impurities; and said weld metal has a micro-structure containing acicular ferrite not less than 55% by area ratio:

$$P_{WM} = P_{cm} + 3.19Ti - 1.020, \text{ and}$$

$$P_{cm} = C + Si/30 + (Mn + Cu + Cr)/20 + Ni/60 + Mo/15 + V/10 + 5B$$

$$P_{rh} = Cr + Cu + Ni + 2Mo + 10V + 7Nb + 5Ti.$$

\* \* \* \* \*

UNITED STATES PATENT AND TRADEMARK OFFICE
CERTIFICATE OF CORRECTION

PATENT NO. : 5,837,956
DATED      : November 17, 1998
INVENTOR(S): Okabe, et al

It is certified that error appears in the above-identified patent and that said Letters Patent is hereby corrected as shown below:

In column 16, at line 2, please change "2.01" to --2.0%--.

Signed and Sealed this

First Day of June, 1999

Attest:

Attesting Officer

Q. TODD DICKINSON

Acting Commissioner of Patents and Trademarks